United States Patent [19]

Klose et al.

[11] 4,123,157

[45] Oct. 31, 1978

[54] DRY PROCESS PRODUCTION AND ANNOTATION OF ARCHIVAL MICROFORM RECORDS FROM HARD COPY

[75] Inventors: Peter H. Klose, Troy; Stanford R. Ovshinsky, Bloomfield Hills, both of Mich.

[73] Assignee: Energy Conversion Devices, Inc., Troy, Mich.

[21] Appl. No.: 742,645

[22] Filed: Nov. 17, 1976

[51] Int. Cl.² .................... G03B 27/70; G03B 13/26; G03B 27/32
[52] U.S. Cl. .................................. 355/43; 355/19; 355/45; 355/65; 355/54; 355/77; 355/99; 355/132
[58] Field of Search ............. 355/45, 5, 19, 27, 40–43, 355/64, 65, 53, 54, 77, 95, 66, 99, 132

[56] References Cited

U.S. PATENT DOCUMENTS

| | | | |
|---|---|---|---|
| 3,185,026 | 5/1965 | Carlson et al. | 355/19 |
| 3,400,631 | 10/1968 | Rauscher | 355/42 |
| 3,473,451 | 9/1965 | Greenly et al. | 355/43 X |
| 3,526,458 | 1/1968 | Meyers et al. | 355/45 |
| 3,966,317 | 6/1976 | Wacks et al. | 355/19 |
| 4,000,945 | 1/1977 | Tajima | 355/5 X |

*Primary Examiner*—L. T. Hix
*Assistant Examiner*—W. J. Brady
*Attorney, Agent, or Firm*—Wallenstein, Spangenberg, Hattis & Strampel

[57] ABSTRACT

Light reflected from hard copy is reduced to microimage size and applied at an imaging and developing station to a dry-process mask film strip which is photosensitive to the reflected light and which is developed by heat to provide microimaged transparencies therein. Such microimaged transparencies in the mask film strip are transferred in an image transferring station to a dry-process microform film to provide imaged microform records therein which conform to the transparent microimages in the mask film strip and which have archival properties. The imaging and developing station includes a platform for receiving the hard copy and a projection means for applying the reduced microimage of the hard copy to the mask film strip. Projection means are provided for expanding and projecting an image of said desired imaged microform record in the microform film in expanded normal size onto the platform for viewing the same. Additional hard copy may be received on the platform in specific relation to the expanded normal size image projected onto the platform for annotation purposes, and the light image reflected from the additional hard copy may be reduced to microimage size and applied to the mask film strip for producing a microimaged transparency of the additional hard copy therein and for providing an imaged microform record of the additional hard copy in the desired imaged microform record of the microform film previously projected onto the platform for annotating the same with the additional hard copy. The photosensitive mask film strip is preferably carried in a movable cassette.

38 Claims, 12 Drawing Figures

DRY PROCESS PRODUCTION AND ANNOTATION OF ARCHIVAL MICROFORM RECORDS FROM HARD COPY

In its broader sense, the present invention has to do with an apparatus and method for producing microform records from hard copy wherein a light image reflected from hard copy is reduced to microimage size in an imaging station and wherein said light image of microimage size provides imaged microform records in a microform film. The imaging station includes a platform for receiving the hard copy and a projection means for reducing the light image reflected from the hard copy on the platform for providing imaged microform records in the microform film.

Generally, in accordance with this invention, means are provided for moving a desired imaged microform record in the microform film to the imaging station, and means, including said projection means, are provided for expanding and projecting an image of the desired imaged microform record in the microform film in expanded normal size onto the platform for readily viewing the same. Also, in accordance with this invention, additional hard copy may be received on the platform in specific relation to the expanded normal size image projected onto the platform for annotation purposes, and means, including said projection means, are provided for reducing an image of the additional light reflected hard copy on the platform to microimage size for providing an imaged microform record of the additional hard copy in the desired imaged microform record previously projected onto the platform for annotating the same with the additional hard copy.

In a more specific sense, the present invention relates to the dry-process production of archival microform records from light reflecting hard copy, such as disclosed in U.S. Pat. No. 3,966,317, granted June 29, 1976, and is directed to certain improvements therein, including those discussed above, which in combination greatly enhance the versatility and simplify the construction thereof.

A dry-process apparatus and method for producing archival microform records from light reflecting hard copy, such as disclosed in said U.S. Pat. No. 3,966,317, include an imaging and developing station wherein a light image reflected from the hard copy is reduced to microimage size and applied to a dry-process mask film strip which is photosensitive to and imaged by the light reflecting hard copy and which is developed by heat to provide microimaged transparencies therein. The apparatus and method also include an image transferring station wherein the microimaged transparencies in the mask film strip are transferred by radiant energy above a certain critical value passing therethrough to a dry-process microform film which has archival properties and which is sensitive to and imaged and developed by the radiant energy above the certain critical value applied thereto through the dry-process mask film strip to provide imaged microform records therein which conform to the transparent microimages in the dry-process mask film strip and which have archival properties. Such an apparatus and method also include means for moving the dry-process mask film strip to the imaging and developing station and to the image transferring station, and means for positioning the dry-process microform film and superimposing the dry-process mask film strip and the dry-process microform film in the image transferring station.

The dry-process microform film is preferably in microfiche form where the microform records therein are arranged in frames. Hard copy information or data may be initially transferred at desired frames or points on the microform film and, later, additional information or data may be transferred at other desired frames or points thereof, the microform film having "add on" capabilities and being updatable. As a result, a records manager is able to file microimages of records in the same manner of organization of paper files, with all the advantages of microfilm files.

Such an apparatus and method for producing microform records from light reflecting hard copy utilize a completely dry-process operation eliminating the need for wet developing and processing steps, provide microform records which are not grainy and which have sharp resolution and high contrast and which have excellent archival properties so as not to be deleteriously effected by light, temperature, moisture, degradation or the like over a period of many years, are simple and straight forward in use and particularly adaptable for in line continuous and repetitive use, and are capable of dry-process table or desk top use.

An object of this invention is to provide such an apparatus and method for producing microform records from light reflecting hard copy with a means for readily viewing desired microform records provided in the microform film.

In this respect, the imaging and developing station of the apparatus and method include a platform for receiving the hard copy and a projection means for reducing a light image reflected from the hard copy on the platform to microimage size and applying the same to the dry-process mask film strip for producing microimaged transparencies therein for subsequently providing imaged microform records in the dry-process microform film in the image transferring station. The hard copy received on the platform comprises information or data placed on the platform wherein the information or data can be a real object placed on the platform, can be contained on a substrate placed on the platform, can be written on the platform or can be an image projected on the platform from a transparency or from a real object, or the like.

The apparatus and method also include means for moving a desired imaged microform record in the dry-process microform film to the imaging and developing station, and means including said projecting means for expanding and projecting an image of the desired imaged microform record in the dry-process microform film in expanded normal size onto the platform for viewing the same. Preferably the imaged microform records are located in frames in the microfiche form of the dry-process microform film. In this way, a simple meachanism is provided in the apparatus and method for viewing in full or normal size desired microform records in the microform film.

The method and apparatus also provides for successively moving adjacent desired imaged microform records or frames in the dry-process microform film to the imaging station for successive viewing of the same. Provision is also made for printing the expanded normal size image projected onto the platform on a photo-sensitive medium placed on the platform.

Another object of this invention is to provide a simple means for "annotating" a desired already existing microform record in the microform film, as for example, deleting or adding additional information to the existing microform record in a frame of the microfiche form of the microform film.

Here, an image of the desired microform record to be annotated is first projected onto the platform in expanded normal size, as discussed immediately above, so as to be clearly visible thereon. Then, additional hard copy is received on the platform in appropriate specific relation to the expanded normal size image projected onto the platform from the desired microform record in the microform film for annotating purposes. In this way, the additional hard copy for annotating purposes is accurately positioned on the platform. The additional hard copy may include deleting material or additional material to be added to the desired microform record. The additional hard copy received on the platform comprises information or data placed on the platform, whether for deleting or adding purposes, and which can be contained on a substrate placed on the platform or written on the platform or the like. Thereafter, means, including said projection means, reduces the image of the additional light reflecting hard copy on the platform and applies the same to the dry-process mask film strip in the imaging and developing station for producing a microimaged transparency of the additional hard copy therein and for providing in the image transferring station an imaged microform record of the additional hard copy in the desired imaged microform record previously projected onto the platform for annotating the same with the additional hard copy. In this way, a simple and accurate mechanism is provided in the apparatus and method for annotating or bringing up to data desired microform records (frames) in the microform film, an extremely important feature for maintaining current microform records in the microform films.

In accordance with the instant invention, the means for positioning the desired frames of the microform film in the image transferring station for providing microform records therein and the means for moving a desired imaged frame of the microform film to the imaging and developing station for viewing and/or annotating the microform record therein include X-axis and Y-axis carriages for positioning a microform film holder carrying the microform film and means for moving the X-axis carriage and the Y-axis carriage and, hence, the microform film holder in the X and Y directions.

A further object of this invention is directed to the manner of moving the dry-process mask film strip to the imaging and developing station for providing microimaged transparencies therein and to the image transferring station for transferring such microimaged transparencies therein to the microform film for providing archival microform records in the microform film. In this respect, the dry-process mask film strip is contained in a cassette provided with means for indexing the mask film strip therein for providing successive microimaged transparencies therein, and the means for moving the mask film strip to the imaging and developing station and to the image transferring station comprises means for moving the cassette for doing so.

Still further objects of this invention reside in the construction of the apparatus and in the co-operative relationships between the component parts of the apparatus, and reside in the method and in the co-operative relationships between the steps of the method.

Other objects and advantages of this invention will become apparent to those skilled in the art upon reference to the accompanying specification, claims and drawings, in which:

FIG. 8 is a chart illustrating the record cycle of the apparatus.

Figure 1:
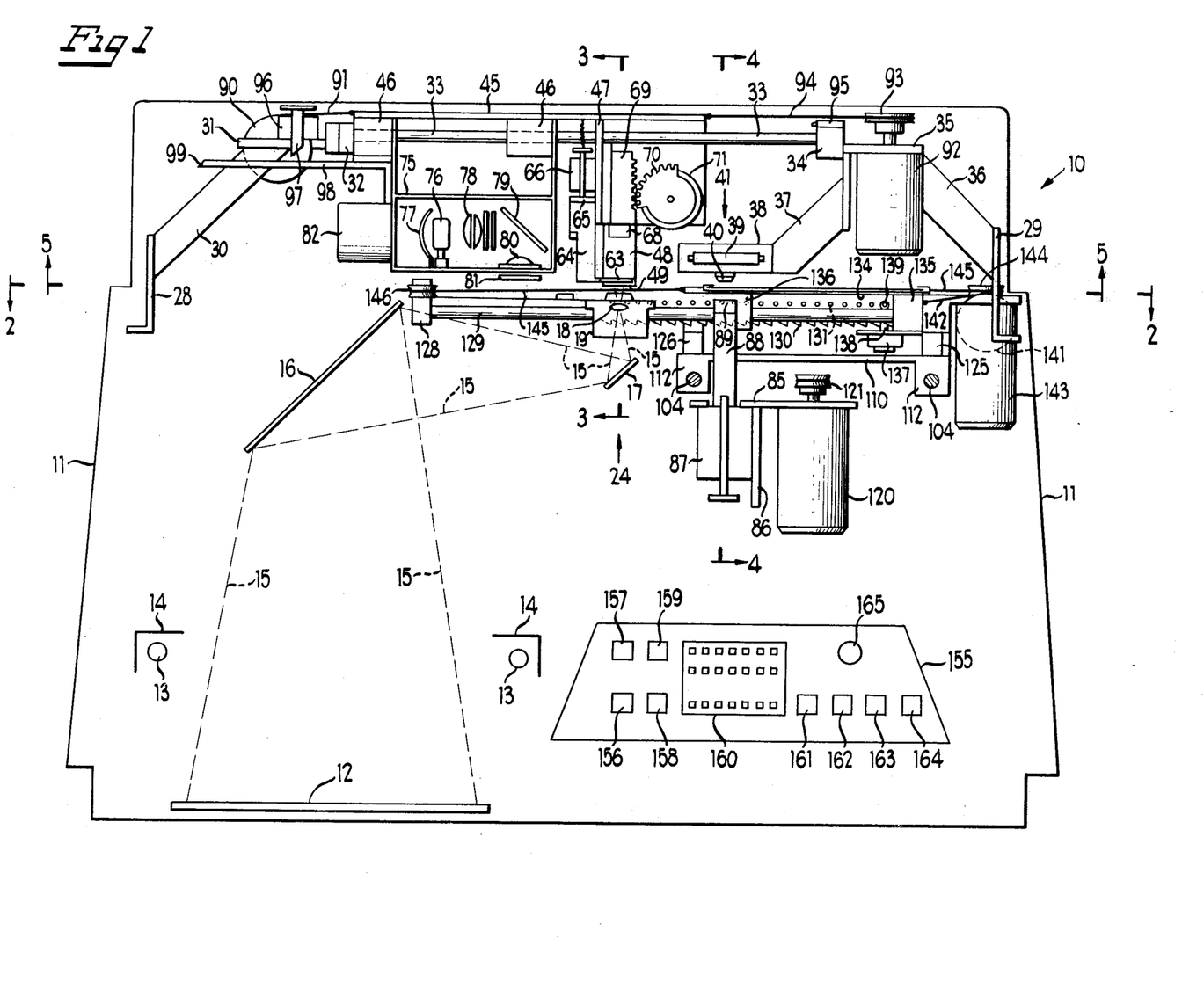
FIG. 1 is a diagrammatic front elevational view of a preferred embodiment of this invention.

A preferred embodiment of the dry-process apparatus of this invention for producing archival microform records from light reflecting hard copy is generally designated at 10 in the drawings. It includes a housing having the general outline indicated at 11 and a supporting frame therein. The frame carries a platform 12 which is adapted to receive hard copy to be microimaged. Light is applied to the platform 12 by lamps 13 and reflectors 14. A light image 15 reflected from the hard copy on the platform 12 is projected and reduced to microimage size by mirrors 16 and 17 and a lens 18 in a lens assembly 19. After passing through the lens 18 the microimage is reversed and is applied to a mask film strip 49. The application of the microimage to the mask film strip 49 is controlled by a shutter 20 having an opening 21 therein. The shutter is normally held closed by a spring 22 but is opened by energization of a shutter solenoid 23 as illustrated more clearly in FIG. 2. The lens assembly 19 is arranged in an imaging and developing station generally designated at 24. Access to the platform 12 for providing the same with hard copy to be microimaged and for viewing images projected onto the platform 12 is provided by an enlarged opening (not shown) in the front of the housing.

Frame portions 28 and 29 of the frame provide a support for a bridge extending across the top portion of the apparatus. Here, the frame portion 28 carries a pair of brackets 30 which, in turn, carry a support plate 31 and a block 32 in which the ends of a pair of rods 33 are secured. The other ends of the rods 33 are secured in a block 34 carried by a plate 35 which, in turn, is secured by brackets 36 to the other frame portion 29. Another bracket 37 depending from the plate 35 carries a flash lamp housing 38 in which is located a flash lamp 39 for projecting radiant energy, such as a Xenon flash, through a transparent window 40. The flash lamp assembly comprises an image transferring station generally designated at 41.

Figure 3:
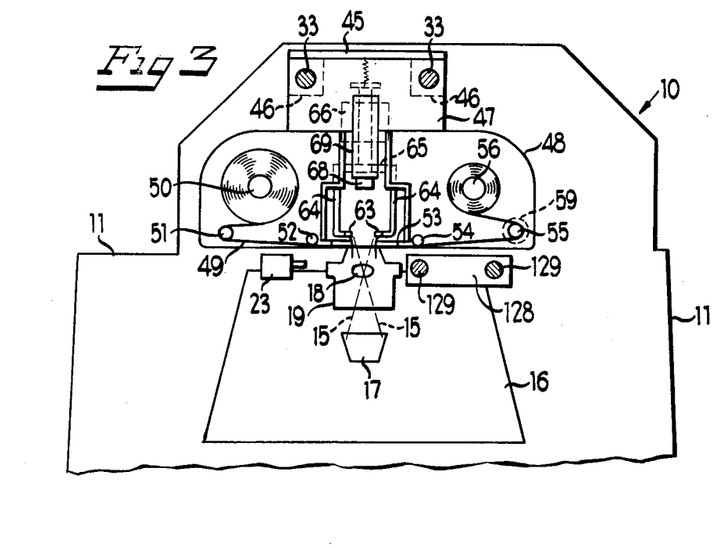
FIG. 3 is a diagrammatic vertical sectional view of a portion of the apparatus looking to the left and taken substantially along the line 3—3 of FIG. 1.

A mask film strip carriage 45 is provided with bearings 46 for slideably mounting the same on the stationary rods 33. The mask film carriage 45 has a bracket 47 for removably receiving a cassette 48 carrying a dry-process mask film strip 49 which is photosensitive to and imaged by the light reflecting hard copy on the platform 12 and which is developed by heat to provide microimaged transparencies therein. As shown more clearly in FIGS. 3 and 5, the unimaged mask film strip 49 is carried in roll form by a pay off reel 50. The mask film strip 49 courses over a roll 51 and under a roll 52 past an opening 53 in the cassette 48 and under a roll 54 and over an indexing roll 55 and is rolled onto a take up reel 56. The opening 53 in the cassette 48 for exposing the mask film strip 49 overlies the lens assembly 19 in the imaging and developing station 24. The mask film strip 49 is incrementally advanced or indexed from the pay off reel 50 to the take up reel 56 and such indexing of the mask film strip 49 presents an unimaged area to be imaged by the light reflecting hard copy in the imaging and developing station 24.

The take up reel 56 is driven by an index motor 57 carried by the bracket 47 and the pay off reel 50 is provided with a suitable slip brake 58, also carried by the bracket 47, for applying resistance to the pay off reel 50. The roller 55 engaged by the mask film strip 49 operates an indexing counter comprising a small disc 59 rotated by the roller 55 and having circumferentially arranged reflecting and nonreflecting sectors and a light source and photocell assembly 60 which directs light onto the disc 59 and which counts the interruptions of the light as the disc 59 is rotated by the roller 55. The index motor 57 is controlled by the indexing counter to assure that the mask film strip 49 is advanced a fixed linear distance each time that the mask film strip is advanced. Suitable releasable couplings are provided between the pay off reel 50 and the slip brake 58, the take up reel 56 and the index motor 57, and the roller 55 and the rotatable disc 59 of the indexing counter 60 so that the cassette 48 containing the mask film strip 49 may be readily applied to and removed from the apparatus as a unit. An opening (not shown) is provided in the front of the housing to provide access for the application and removal of the mask film strip cassette 48.

A mask film hold down apparatus is provided for holding the mask film 49 against the lens assembly 19 while a microimage of the hard copy on the platform 12 is being applied to the mask film strip 49. This apparatus assures that the mask film strip 49 is maintained in proper focal relation with the lens 18 during the imaging operation. In this connection, the apparatus includes a pair of fingers 63 which extend into the cassette 48 above the mask film strip 49. This pair of fingers 63 is carried by a pair of arms 64 connected to a plate 65 which, in turn, is secured to an armature of a solenoid 66. The armature of the solenoid 66 is normally maintained in a raised position by a spring and is moved to a lowered position upon energization of the solenoid 66 to cause the fingers 63 to press the mask film strip 49 against the lens assembly 19.

After an image is so applied to the mask film strip 49, the image is heat developed by a heater 68 carried by a plunger 69. The heater 68 is suitably electrically heated by a heating element contained therein. The plunger 69 is raised and lowered through rack and pinion teeth, by a pinion 70 rotated by a rotary solenoid 71. When the solenoid 71 is de-energized the plunger 69 is in an elevated position as illustrated in FIG. 1. When the solenoid 71 is energized the plunger 69 is lowered to contact the heater 68 with the mask film strip 49 for heat developing the image in the mask film strip 49 to provide a microimaged transparency therein. The cassette 48 is provided with suitable openings therein for accomodating the heater 68 and the plunger 69.

Thus, in the imaging and developing station 24 the mask film strip 49 is imaged from the hard copy on the platform 12 and is heat developed to provide microimaged transparencies in the mask film strip 49 corresponding to the hard copy on the platform 12. While the imaging of the mask film strip 49 and the development thereof are disclosed to occur in the same position in the imaging and development station 24, the development of the mask film strip 49 could take place at a position therein which is different from the position where the imaging takes place.

The carriage 45 also carries a read illuminator 75. The read illuminator 75 includes a light source 76 and a reflector 77 for directing light through a lens system 78 and a mirror 79 onto a lens 80, the lens being provided with a fiche focusing device 81 comprising a transparent window. When a frame of a fiche is positioned over the lens assembly 19 and the fiche illuminator 75 is moved by the carriage 45 over the lens assembly 19 in the imaging and developing station 24, the fiche focusing device 81 operates to press a desired frame of the fiche against the lens assembly 19 to assure proper focusing of the information in the frame of the fiche to provide clear focusing of the light from the lamp 76 through the lens assembly onto the platform 12. In this way, the information in a frame of a fiche may be accurately projected and expanded to normal size onto the platform 12. The read illuminator 75 may be cooled by fan 82 to prevent the building up of excessive heat therein.

Figure 4:
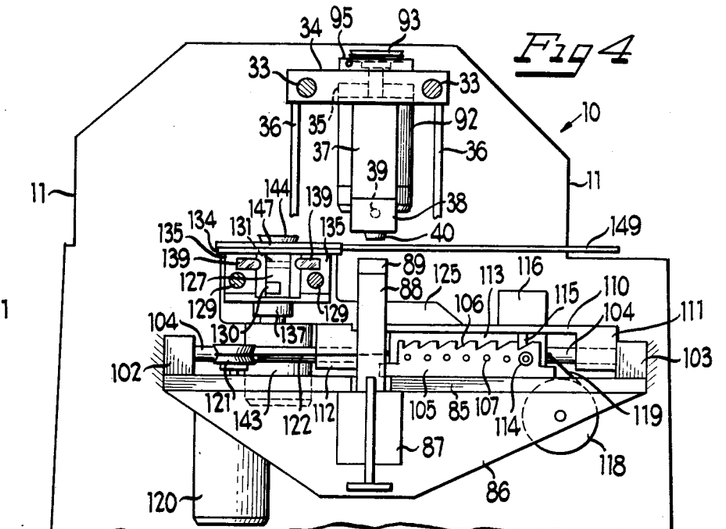
FIG. 4 is a diagrammatic vertical sectional view of another portion of the apparatus looking to the right and taken substantially along the line 4—4 of FIG. 1.
Figure 6:
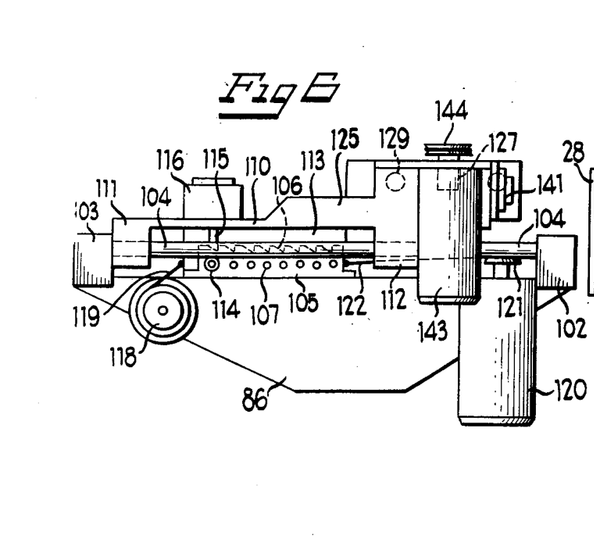
FIG. 6 is a diagrammatic end elevational view of a portion of the apparatus and looking from the right of FIG. 1.

The frame of the apparatus rigidly carries a plate 85 provided with a depending flange 86, as shown more clearly in FIGS. 1, 4 and 6. The plate 85 carries a transfer solenoid 87 whose armature operates a plunger 88 having a resilient transfer pad 89. When the solenoid 87 is de-energized, the plunger 88 is in a lowered position. When the solenoid 87 is energized, the plunger 88 is raised to cause the pad 89 to provide intimate contact between the fiche and the mask film strip 49 and to press them against the transparent window 40 of the flash assembly 37 to assure accurate contact printing between the developed mask film strip and the fiche when energy, such as Xenon flash energy, is projected from the flash lamp 39 through the mask film strip 49 onto the fiche for providing accurate reproduction of the microimage of the mask film strip in the fiche.

Figure 5:
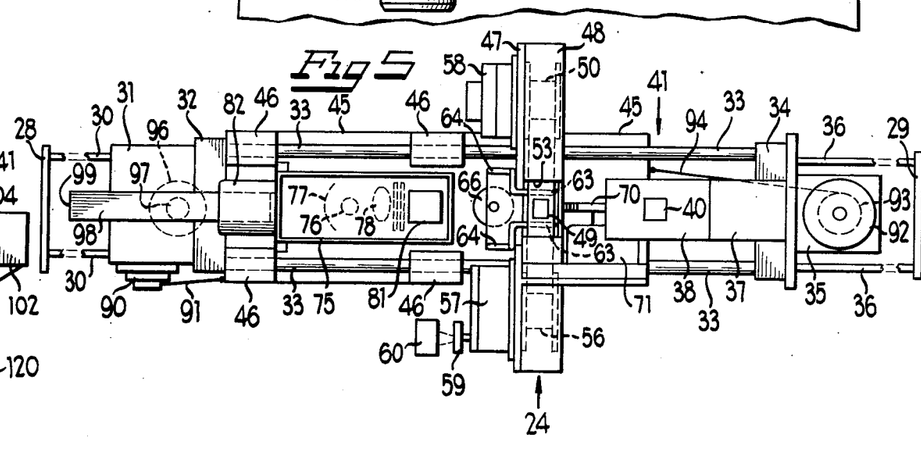
FIG. 5 is a diagrammatic bottom view of a portion of the apparatus looking upwardly and taken substantially along the line of 5—5 of FIG. 1.

A spring motor 90, as shown more clearly in FIGS. 1 and 5, is carried by the bridge and is connected by a cable 91 to one end of the mask film carriage 45 for continuously urging the mask film carriage to the left as illustrated in these Figures. A mask film carriage motor 92 also carried by the bridge rotates a wheel 93 which is connected by a cable 94 to the other end of the mask film carriage 45. When the mask film motor 92 is energized, the wheel 93 operates to move the mask film carriage 45 from the left hand position, as illustrated in FIGS. 1 and 5, to the right hand position where the mask film strip 49 in its cassette 48 is moved to the image transferring station 41 under the transparent window 40 and above the transfer pad 89. The bridge also carries a mask film carriage limit switch 95 which is engaged by the mask film carriage, to interrupt the power to the mask film motor 92. The bridge also carries a mask film carriage latch having a solenoid 96 operating a latch 97. When the solenoid 96 is de-energized, the latch 97 is maintained in a raised position by means of springs or the like. The mask film carriage 45 is provided with an extension 98 having a latch surface 99. When the mask film carriage 45 is moved to the right by the mask film carriage motor 92, to engage the limit switch 95, the solenoid 96 is energized to cause the latch 97 to move downwardly and engage the latch surface 99 to latch the mask film carriage 45 in the right hand position.

Figure 2:
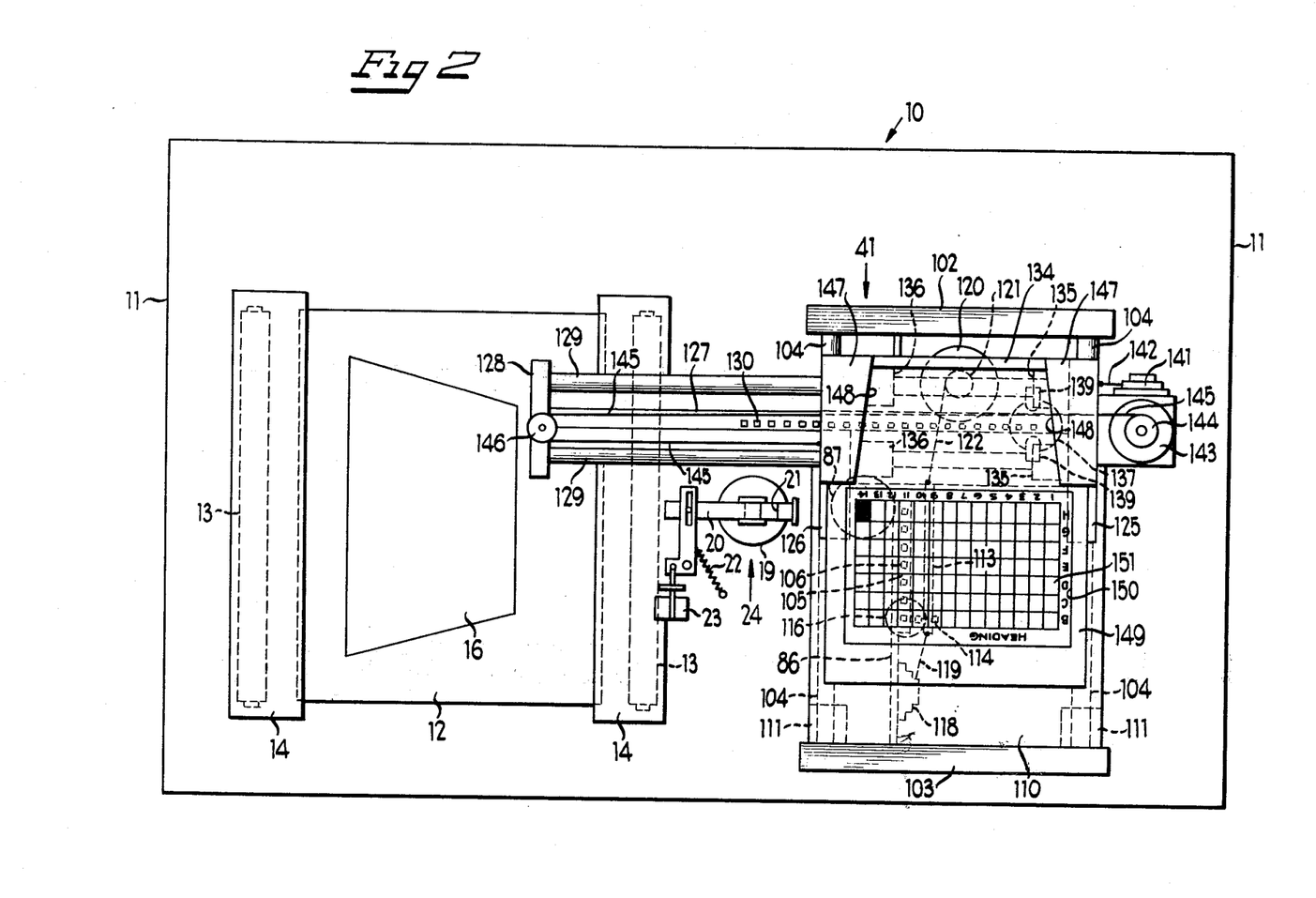
FIG. 2 is a diagrammatic plan view of a portion of the apparatus looking downwardly and taken substantially along the line 2—2 of FIG. 1.

As shown more clearly in FIGS. 2, 4 and 6, the stationary frame plate 85 is provided with a pair of blocks 102 and 103 adjacent the ends thereof in which blocks a pair of rods 104 are rigidly secured. A bar 105 is secured to the stationary plate 85 and it has a plurality of latch teeth 106 (7 in number) on the upper surface thereof. The bar 105 also carries a plurality of phototransistors 107 (7 in number) associated respectively with the latch teeth 106.

The Y-axis carriage 110 is provided with two pairs of bearings 111 and 112, receiving the rods 104 for slideably mounting the Y-axis carriage on the rods. The Y-axis carriage is provided with a depending plate 113 which carries a light 114 which is adapted to traverse the phototransistors 107 as the carriage 110 is moved forwardly or rearwardly on the rods 104. A Y-carriage latch 115, operated by a latch solenoid 116 carried by the Y-axis carriage 110 is adapted to engage the various latch teeth 106 on the bar 105 depending upon the position of the Y-axis carriage. The latch 115 is normally retracted but is moved into engagement with the latch teeth 106 when the solenoid 116 is energized to latch the Y-axis carriage 110 is a desired position to which it has been moved.

A spring motor 118 carried by the stationary flange 86 is connected by a cable 119 to the Y-axis carriage 110, as by being connected to the plate 113, for urging the Y-axis carriage 110 to the home position as illustrated in FIGS. 4 and 6. The stationary plate 85 also carries a Y-axis carriage motor 120 which is provided with a wheel 121 which, in turn, is connected by a cable 122 to the Y-axis carriage 110, as for example, to the plate 113 thereof. When the Y-carriage motor 120 is energized, it advances the Y-axis carriage 110 to the left against the action of the spring motor 118 to a desired selected position as determined by the light 114 co-operating with the phototransistors 107. The latch solenoid 116 is then energized to engage the latch 115 with the appropriate latch tooth 106 for latching the Y-axis carriage 110 in the desired position. The plate of the Y-axis carriage 110 is provided with a slot which accomodates the plunger 88 to allow the aforementioned Y movement of the carriage 110.

The Y-axis carriage 110 is provided along its side edges with a pair of brackets 125 and 126. A bar 127 is connected at one end to the bracket 125 and is connected intermediate its ends to the bracket 126. The other end of the bar 127 is connected to a block 128. A pair of rods 129 are secured at its ends to the bracket 125 and the block 128. The bar 127 is provided with a plurality of downwardly extending latch teeth 130 (21 in number). The bar 127 is also provided with a plurality of phototransistors 131. The phototransistors 131 are preferably arranged in 2 sets of 14 phototransistors which are in staggered relation, as illustrated more clearly in FIG. 7, with some of the phototransistors overlapping and providing 21 phototransistors along the length of the bar 127. The phototransistors 131 are located in relation to latch teeth 130.

An X-axis carriage 134, as shown more clearly in FIGS. 1, 2 and 4, is provided with 2 pairs of bearings 135 and 136 which are mounted for sliding movement on the rods 129 of the Y-axis carriage. A latch solenoid 137 carried by the X-axis carriage 134 operates a latch 138 with respect to the latch teeth 130 on the bar 127. The latch 138 is normally held out of engagement with the latch teeth 130 but is moved into engagement therewith upon energization of the latch solenoid 137. The latch 138 is adapted to engage desired latch teeth 130 on the bar 127 to latch the X-axis carriage 134 in any desired position along the rods 129 to which it may be moved. The X-axis carriage 134 also carries a pair of lights 139 co-operating with the phototransistors 131 for controlling the positioning and latching of the X-axis carriage in desired positions.

The bracket 125 of the Y-axis carriage 110 carries a spring motor 141 which is connected by a cable 142 to the X-axis carriage 134. The spring motor 141 operates to move the X-axis carriage 134 to the home position illustrated in FIGS. 1 and 2. The bracket 125 of the Y-axis carriage 110 also carries a motor 143 provided with a wheel 144 which is connected by a cable 145 which, in turn, courses a pulley 146 mounted on the block 128 and which is connected to the X-axis carriage 134. When the motor 143 is energized, the X-axis carriage 134 is moved to the left from the home position illustrated in FIGS. 1 and 2 to position the X-axis carriage to desired positions along the X-axis. The position of such movement of the X-axis carriage 134 is controlled by the lights 139 co-operating with the phototransistors 131 and after the X-axis carriage 134 is moved to the desired position, the latch solenoid 137 is energized to cause the latch 138 thereof to engage the appropriate latch tooth 130 on the bar 127 to latch the X-axis carriage 134 in the desired position.

The X-axis carriage 134 is provided with a pair of keepers 147 which have tapered edges 148 which in turn are under cut for receiving a tapered end of a fiche holder 149. The tapered and under cut edges 148 of the keepers 147 operate to accurately position and secure the fiche holder 149 in the X-axis carriage 134. The fiche holder 149 is provided with a cut-out 150 for receiving a fiche 151. An opening (not shown) is provided in the front of the housing to provide for inserting and removing the fiche holder 149 in the X-axis carriage 134.

The fiche 151 is a dry-process microform film which has archival properties and which is sensitive to and imaged and developed by radiant energy above a certain critical value applied thereto through the dry-process mask film strip 49 to provide imaged microform records therein which conform to the transparent microimages in the dry-process mask film strip 49 and which have archival properties. The imaged microform records in the microform film 151 are also preferably in the form of microtransparencies. The dry-process microform film 151, in the form of a fiche, has a plurality of frames therein which are arranged in rows B to H and in columns 1 to 14 as illustrated in FIG. 2. The fiche 151 also has a portion for receiving a heading for identifying a particular fiche. The fiche 151 is inserted in the opening 150 in the holder 149 in a reverse position with the heading of the fiche facing outwardly. The home position of the holder 149, as determined by the home positions of the Y-axis carriage 110 and the X-axis carriage 134, is such as to place the frame H-14 in the image transferring station 41 including the flash assembly 38 and the transfer pad solenoid 87. When an image of the hard copy is applied to the mask film strip 49 at the imaging and developing station 24, the image so applied is inverted by the lens 18 of the imaging and developing station 24. When the image in the mask film strip 49 is moved from the imaging and developing station 24 to the image transferring station 41, and radiant energy from the flash assembly 38 is applied through the image in the mask film strip to the fiche 151, the image applied to the frame of the fiche 151, due to the reversed position of the fiche 151 in the fiche holder 149, becomes right reading. The fiche holder 149 and hence the fiche 151 are moved to desired positions by the movement of the Y-axis carriage 110 and the X-axis carriage 134 so as to present any desired frame of the fiche 151 to the image transferring station 41, as for example, B-1, E-7, and the like, for transferring the image in the mask film strip 49 to such desired frame.

Figure 7:
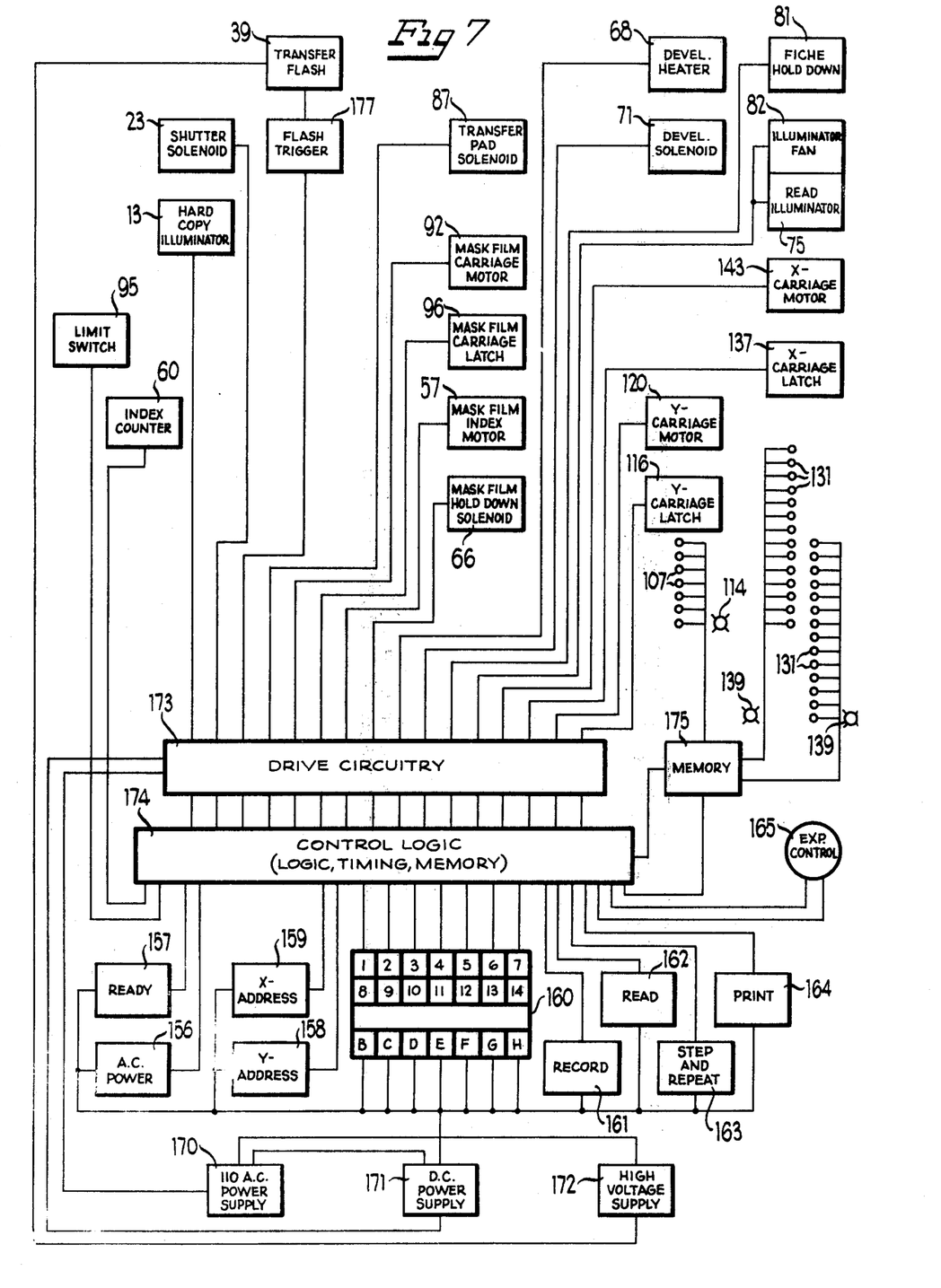
FIG. 7 is a schematic block wiring diagram illustrating the relationships between the various components of the apparatus.

FIG. 7 is a diagrammatic illustration of the various components of the dry-process apparatus of this invention setting forth the circuitry between the various components thereof for controlling the operation of the apparatus. In this connection the apparatus includes a control panel 155, as illustrated in FIG. 1, carried by the front of the housing, which includes an A.C. power key and light 156, a "ready" lamp 157 indicating that the system is ready for operation, a Y-address key 158 and an X-address key 159 for addressing the position of the fiche 151 in the apparatus. An indicator 160 includes a plurality of lamps numbered 1 to 14 for indicating the X or row addressed positions for the fiche 151 and includes a plurality of lamps numbered B to H for indicating the Y or column addressed positions of the fiche 151. The control panel also includes a record key and light 161, and read key and light 162, a step and repeat key 163 and a print key 164. The control panel 155 also includes an exposure control 165 for controlling the time during which the shutter 20 is open.

The apparatus includes a 110 volt A.C. power supply 170 connected to a D.C. power supply 171 and to a high voltage supply 172. The A.C. power supply 170 and the D.C. power supply 171 are connected to the drive circuitry 173 for supplying A.C. power and D.C. power thereto. The high voltage supply 172 is applied to the transfer flash assembly 39 which is controlled by a flash trigger 177. The drive circuitry 173 is controlled by a control logic 174, such as a conventional micro-processor including logic, timing and memory functions, and also, if desired, a further memory unit 175.

The A.C. power key 156 energizes the circuitry and the ready lamp 157 indicates when the circuitry is ready for operation. The X-address key 159 and the Y-address key 158 operate to store in the control logic 174 and memory 175 the desired column and row addresses or positions to be assumed by the fiche 151 operated by the X and Y axis carriages of the apparatus and to indicate the desired X and Y address positions on the indicator 160. The record key and light 161, which is a momentary contact key, operates to start and complete a "record" cycle in the apparatus. The read key and light 162, which is a push on and push off key, operates to start and stop a "read" cycle of the apparatus. The step and repeat key 163 operates to provide a "step and repeat cycle" for the read cycle. The print key 164 operates to provide a "print" cycle for the read cycle. These various keys and the indicators 160 are connected into the control logic 174 and the memory 175 for providing the aforementioned cycles of operation. The mask film carriage limit switch 95 and the mask film strip counter 60 are also connected into the control logic 174 as is the exposure control 165 and the memory 175. The Y-axis phototransistors 107 controlled by the light 114 and the X-axis phototransistors 131 controlled by the light 139 are connected into the memory 175 and the control logic 174. The control logic 174 and the memory 175 are connected into the drive circuitry 173 and operate to control the drive circuitry.

The drive circuitry 173 is connected to and controls the hard copy illuminator 13, the shutter solenoid 23, the flash trigger 177 for the transfer flash 39, the transfer pad solenoid 87, the mask film carriage motor 92, the mask film carriage latch 96, the mask film index motor 57, the mask film hold down solenoid 66, the development heater 68, the development solenoid 71, the Y-carriage motor 120, the Y-carriage latch 116, the X-carriage motor 143, the X-carriage latch 137, the fiche hold down 81, and the read illuminator 75 and illuminator fan 82.

The record cycle of the apparatus of this invention is illustrated in FIG. 8 which plots the various functions of the elements of the apparatus against time, in seconds. When the A.C. power key 156 is pushed, the development heater 68 is energized and after the heater is brought up to the desired temperature the ready lamp 157 is lit. The mask film carriage is in its home position to the left as illustrated in FIGS. 1 and 5. The Y-axis carriage 110 is in its home position as illustrated in FIGS. 2, 4 and 6 and the X-axis carriage 134 is in its home position as illustrated in FIGS. 1 and 2. The cassette 48 containing the mask film strip 49 is in the imaging and developing station 24 above the lens assembly 19 and the frame H-14 of the fiche 151 is in the image transferring station 41 below the flash assembly window 40 and above the transfer pad solenoid 87. Hard copy to be microimaged is applied to the platform 12.

The record key 161 is depressed to make a momentary contact which illuminates the record key light therein to indicate the existance of the record cycle and to start the record cycle. In the record cycle the hard copy lights 13 are turned on and the mask film index motor 57 is indexed under the control of the index counter 60 to present an unimaged portion of the mask film strip 49 above the lens assembly 19 of the imaging and developing station 24. After the mask film strip 49 has been so indexed, it is held against the lens assembly 19 by energization of the mask film hold down solenoid 66. While the mask film strip is being so held down, the shutter solenoid 23 is energized to open the shutter 20 to expose the mask film strip 49 to the image which is reflected from the hard copy on the platform 12 and which is projected and reduced and applied through the shutter opening 21 onto the mask film strip 49. The exposure control 165 operates to control the length of time during which the shutter 20 is open. In about 1½ seconds after the start of the record cycle, the hard copy lights 13 are turned off and the mask film hold down solenoid 66 and the shutter solenoid 23 are de-energized. At this time, the development solenoid 71 is energized to press the development heater 68 against the mask film strip 49 for the purpose of heat developing the microimage in the mask film strip 49 into a microfilm transparency. This development period lasts for about 3 seconds, whereupon the development solenoid 71 is de-energized to move the development heater 68 upwardly.

At the end of the development period, the mask film carriage motor 92 is energized to move the mask film carriage 45 to the right, as indicated in FIGS. 1 and 5, to move the cassette 48 to the image transferring station 41 where the microimaged transparency of the mask film strip 49 is interposed over the fiche 151 and under the flash assembly window 40. When the mask film carriage 45 reaches the right hand position, it causes the mask film limit switch 95 to de-energize the mask film carriage motor 92 and to energize the mask film carriage latch 96 for latching the mask film carriage 45 in the right hand position.

Prior to the initiation of the record cycle, the Y-address key 158 and the X-address key 159 are manipulated to store in the control logic 174 and the memory 175 the desired X and Y positions of the fiche 151, as for example, the position G-13, which are indicated by the indicator 160. At the end of the development period, the X-carriage motor 143 and the Y-carriage motor 120 are energized to move the X-axis carriage 134 and the Y-axis carriage 110 from their home positions (H-14). When the X-axis carriage 134 and the Y-axis carriage 110 reach the desired positions, as for example G-13, the light 139 co-operating with the phototransistors 131 and the light 114 co-operating with the phototransistors 107 match the signals introduced by the X-address key 159 and the Y-address key 158 in the logic control 174 and memory 175 to position the X-carriage motor 143 and the Y-carriage motor 120 in the appropriate positions, as for example G-13, and following a motor operating time interval of a little over a second the X-carriage motor 143 and the Y-carriage motor 120 are de-energized. At this time, the X-carriage latch 137 and the Y-carriage latch 116 are energized to latch the X-axis carriage 134 and the Y-axis carriage 110 in the desired positions, as for example G-13. In this way, the fiche carrier 149 positions the fiche 151 in the desired position in the image transferring station 41. While the X-axis carriage 134 and the Y-axis carriage 110 are so latched, the transfer pad solenoid 87 is energized to raise the transfer pad 89 to clamp the overlapping mask film strip 49 and fiche 151 in the image transferring station 41 between the transfer pad 89 and the window 40 of the flash assembly 38. While the mask film strip 49 and the fiche 151 are so clamped in contact print relation, the transfer flash trigger 177 is operated to cause the flash lamp 34 to pass radiant energy through the transparency in the mask film strip 49 to the fiche 151 to provide an imaged microform record in the frame G-13 of the fiche 151 which conforms to the transparent microimage in the dry-process mask film strip 49. At the end of the record cycle, following the transfer of the microimage in the mask film strip 49 to the fiche 151, the mask film latch 96, the X-carriage latch 137, and the Y-carriage latch 116 are released and the transfer pad solenoid 87 is de-energized, so that the mask film carriage 45, the X-axis carriage 134 and the Y-axis carriage 110 are moved by the spring motors 90, 141 and 118 to return these carriages under spring power to their home positions, to again position the fiche 151 in its home position (H-14). This movement is freely permitted since the transfer pad solenoid 87 is also de-energized. Following the de-energization and releasing of the latches, the carriages are returned to their home positions within a total record cycle period of about 6½ seconds to make ready for a subsequent record cycle which is substantially the same as that discussed above. When the record cycle is completed as described above, the record key light in the record key 161 is also extinguished to inform the operator that the apparatus is ready for another record cycle.

Figure 10:
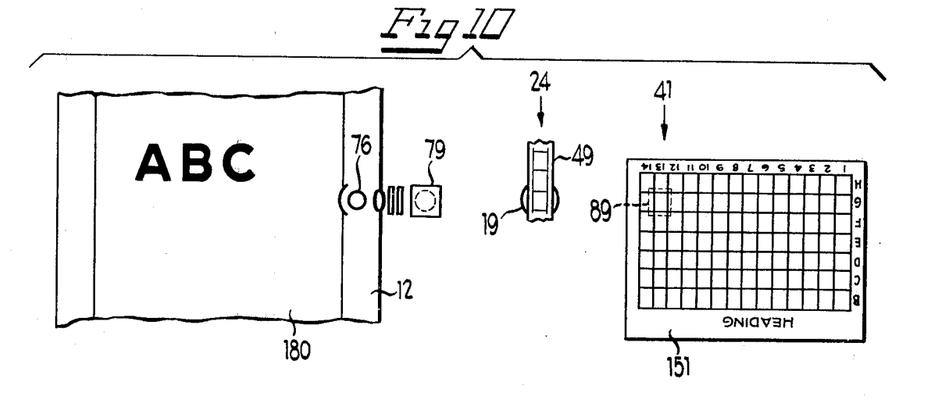
FIGS. 10 and 11 are simplified schematic views of the apparatus illustrating the relationships of the platform, the imaging and developing station, the image transferring station, the mask film strip and the microform film or fiche during the recording cycle.
Figure 11:
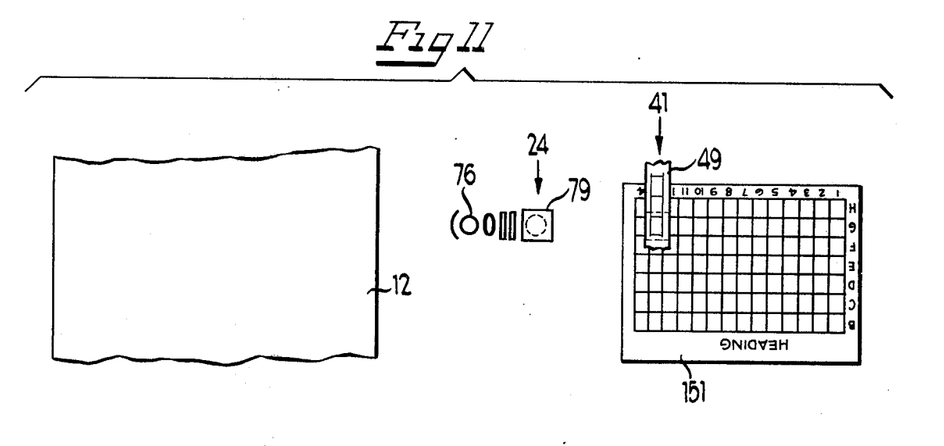

The foregoing record cycle is schematically illustrated in FIGS. 10 and 11. In FIG. 10 hard copy, such as information or data on a substrate 180, illustrated as A B C, is carried by the platform 12 and that hard copy is microimaged and developed in the mask film strip 29 in the imaging and developing station 24. Also, as for example, the fiche 151 is positioned by the X and Y axis carriages to present the frame of G-13 of the fiche 151 to the image transferring station 41. Following the imaging and developing of the mask film strip 49 in the imaging and developing station 24, it is moved by the mask film carriage to the image transferring station 41 wherein the microimage just produced therein overlies the frame G-13 of the fiche 151 in the image transferring station 41 and the microimage transparency in the mask film strip 49 is transferred to the frame G-13 of the fiche 151 by the radiant energy. When the mask film carriage 45 is moved to present the mask film strip 49 to the image transferring station 41, the read illuminator 75 including the lamp 76 and the mirror 79 is moved to the imaging and developing station 24, but during the record cycle the read illuminator performs no function.

The apparatus of this invention also provides for a read cycle wherein the microform record in any frame of the microfiche 151 may be projected and expanded to normal size onto the platform 12 for viewing and reading the microform information contained in any desired frame of the microfiche 151. Such a read cycle is set forth in FIG. 9 wherein the operation of the relevant components for the read cycle are plotted against time, in seconds. Before starting the read cycle, the X-address key 159 and the Y-address key 158 are manipulated to present to the control logic 174 and memory 175 the particular frame of the fiche 151 to be read in the imaging and developing station 24, this information being indicated by the lamps 1 to 14 and B to H in the indicator 160. The read key 162, which is a push on key and a push off key, is pushed on and the read key light in the read key 162 is illuminated. At the same time, the lamp 76 of the read illuminator 75 is turned on as well as the read illuminator fan 82. Also, at this same time, the X-carriage motor 143, the Y-carriage motor 120 and the mask film carriage motor 92 are all energized. The X-carriage motor 143 and the Y-carriage motor 120 operate to position the X-axis carriage 134 and the Y-axis carriage 110 to the appropriate position determined by the X-address and Y-address signals sent to the control logic 174 and the memory 175, the position of the X-axis carriage 134 being determined by the lights 139 with respect to the phototransistors 131 and the position of the Y-axis carriage 110 being determined by the light 114 with respect to the phototransistors 107. In this way, any of the frames B-1 to H-14 may be moved to the imaging and developing station 24 including the lens assembly 19.

At the same time, the mask film carriage 45 is moved to the right so that the read illuminator 75 including the lamp 76, mirror 79 and lens 80 is moved to the imaging and developing station 24. Thus, the read illuminator is positioned over the selected frame of the fiche 151 in the imaging and developing station 24. Following a time interval of slightly over 1 second, the X-carriage motor 143 and the Y-carriage motor 120 are de-energized and the X-carriage latch 137 and the Y-carriage latch 116 are energized to latch the X-axis carriage 134 and the Y-axis carriage 110 in the selected positions. When the mask film carriage 45 is moved to the right, the limit switch 95 is operated to de-energize the mask film carriage motor 92 and to energize the mask film carriage latch 96 to latch the mask film carriage 45 in the right hand position with the lens 80 of the read illuminator 75 over the lens assembly 19. When such latching occurs, the fiche hold down 81 is moved downwardly to clamp the fiche 151 against the lens assembly 19 to assure accurate focusing of the fiche 151 with respect to the lens assembly 19. Also at this time, the shutter solenoid 23 is energized to open the shutter 20 and allow light from the read illuminator 75 to pass through the desired frame of the fiche 151 and the lens assembly 19 to project and expand the light image through the selected frame of the fiche 151 onto the platform 12 in normal size. In this way, the microimage in any frame of the fiche may be read in normal size on the platform 12.

After the normal sized image projected onto the platform 12 has been viewed, the read key 162 is pushed off to terminate the read cycle whereupon the read key light is turned off, the read illuminator lamp 76 is turned off, the read illuminator fan 82 is turned off, the X-carriage latch 137 is de-energized, the Y-carriage latch 116 is de-energized, the mask film carriage latch 96 is de-energized, the fiche hold down 81 is de-energized and the shutter solenoid 23 is de-energized. All of the carriages including the X-axis carriage 134, the Y-axis carriage 110 and the mask film carriage 145 are returned to their home positions by the spring motors associated with these carriages. The control logic 174 and the memory 175 are also reset to home (H-14) so as to prepare the apparatus for another read cycle or a record cycle.

Figure 12:
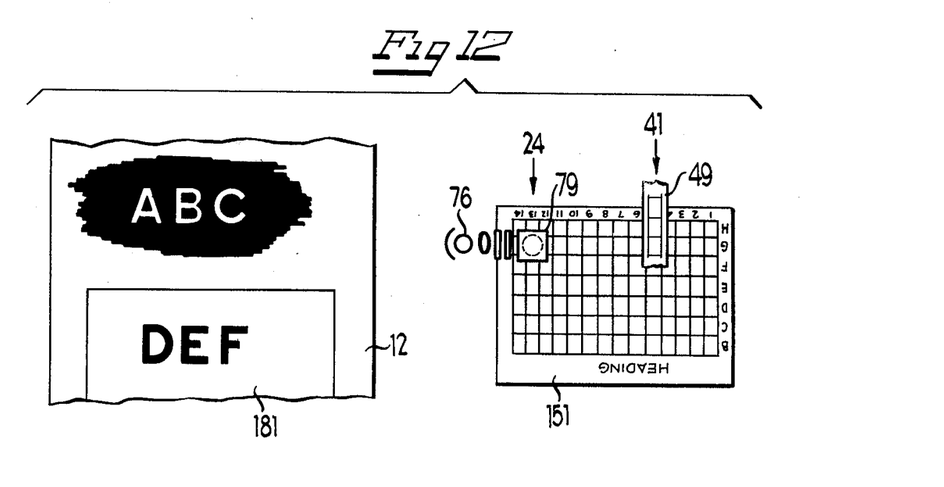
FIG. 12 is a simplified schematic view of the apparatus illustrating the relationships of the platform, the imaging and developing station, the image transferring station, the mask film strip and the microform film or fiche during the read cycle and the annotation operation.

As an example, FIG. 12 illustrates a read cycle condition wherein the fiche 151 is positioned to superimpose the frame G-13 thereof in the imaging and developing station 24 over the lens assembly 19, and the mirror 79 and lens 80 of the read illuminator 75 are moved to the imaging and developing station 24 over the selected frame G-13 of the fiche 151. The read illuminator 75 projecting light through the frame of the fiche 151 produces a projected normal size image on the platform 12 corresponding to the microimage previously recorded in that frame of the fiche 151. The expanded image projected on the platform 12 is a negative of the initial data or information of the hard copy on the substrate 180 previously recorded on the fiche 151 since, as here contemplated, the mask film 49 is negative working to provide a negative transparency therein and the microform film of the fiche 151 is positive working to provide a transparency therein which is positive with respect to the negative transparency on the mask film strip 49 and, hence, negative with respect to the hard copy 180 previously recorded.

This invention also provides a simple method and means for "annotating" a desired already existing microform record in the microform film, as for example, deleting or adding additional information or data to the existing microform record in a frame of the microfiche which has previously been microimaged. This annotating feature of this invention is also diagrammatically illustrated in FIG. 12. As expressed above, the data or information on the frame G-13 of the microfiche 151 is expanded and projected onto the platform 12. Thereafter, additional hard copy having additional data and information, such as on a substrate 181, illustrated as D E F, is applied to the platform 12 and in so doing the additional hard copy 181 may be appropriately positioned with respect to the previously recorded data or information projected on the platform 12. Thus, accurate relationships between the additional hard copy 181 and the previously recorded image in the fiche 151 is assured. Also, if it is desired to delete any of the previously recorded data or information suitable deleting material may be placed over the portion of the image projected on the platform 12 to be deleted. As for example, the projected letter C may be covered with the deleting material.

The annotation is accomplished by operating the apparatus in accordance with the record cycle described above wherein the frame of G-13 of the fiche 151 is positioned in the image transferring station 41 as indicated in FIG. 10, and the mask film strip 49 is indexed in the imaging and developing station 24 to receive an image of the additional hard copy including any additional material or deletion material. The mask film strip 49 containing the additional material or deletion material is them moved from the imaging and developing station 24 to the image transferring station 41 over the frame G-13 as illustrated in FIG. 11, so as to image that frame with the additional material or deletion material and, hence, annotate that frame. The additional hard copy 181 instead of being on a substrate or the like, may comprise writing directly on the platform 12 and the deleting material may comprise writing over the information projected from the previously recorded microform record in the frame G-13 of the fiche 151. Following the annotation, such writing on the platform 12 may be removed by washing or the like. Also, if desired, the initial hard copy on the platform 12, as illustrated in FIG. 10, may be accomplished by writing on the platform 12 or by projecting an image on the platform 12 as discussed above.

Figure 9:
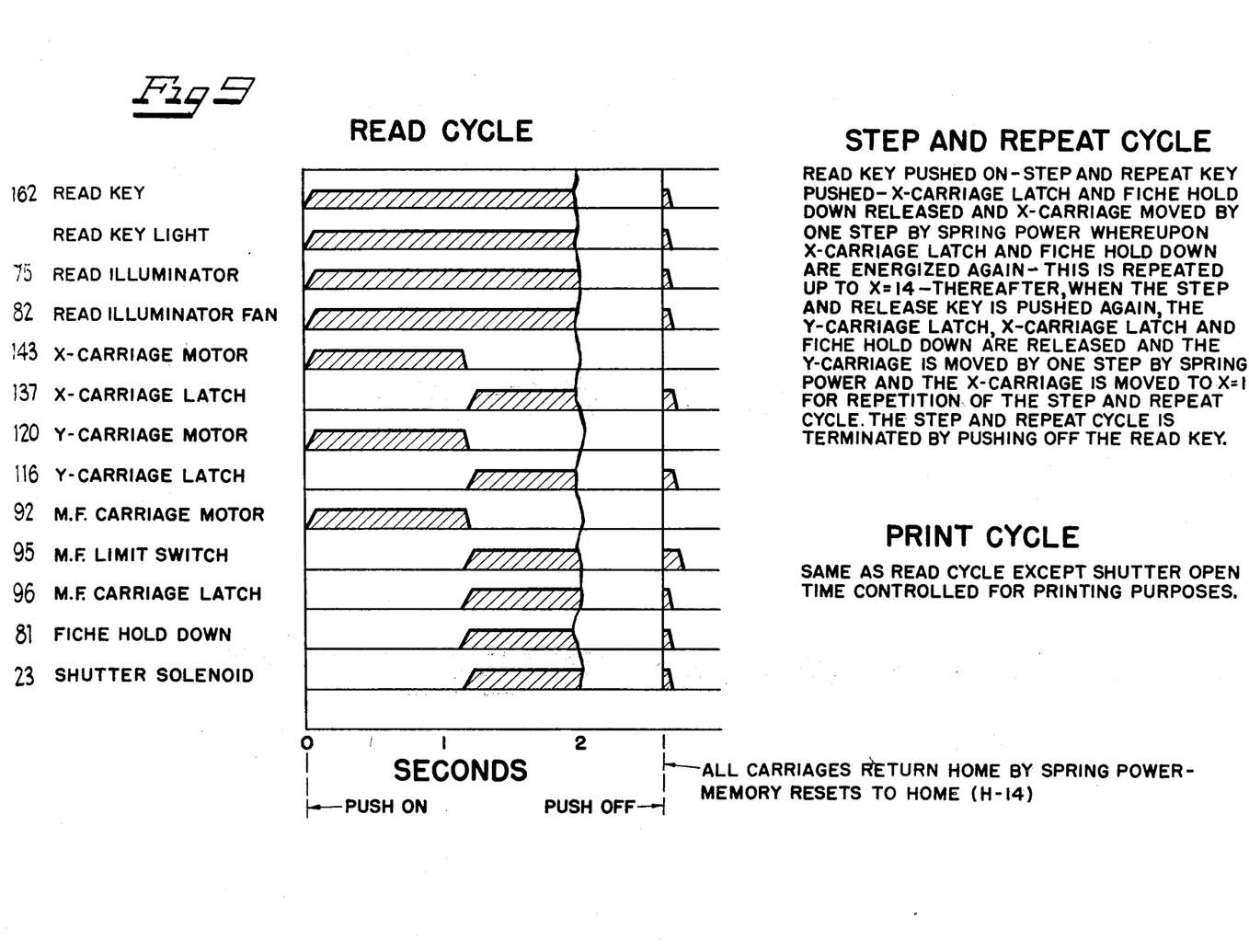
FIG. 9 is a chart illustrating the read cycle, the step and repeat cycle and the print cycle of the apparatus.

As set forth in FIG. 9, the apparatus of this invention also includes a "step and repeat" cycle for serially viewing the microform records in the frames of the fiche 151. In this respect, the step and repeat cycle includes the first part of the read cycle. The read key 162 is pushed on to perform the read cycle. After the data and information of a frame is viewed on the platform 12, the step and repeat key 163 is pushed and thereupon the X-carriage latch 137 and the fiche hold down device 81 are released and the X-axis carriage 134 is moved by one step, by spring power, whereupon the X-carriage latch and fiche hold down are energized again. In this way, the next adjacent frame may be viewed. This operation is repeated up to X=14 in a row. Thereafter, when the step and repeat key 163 is pushed again, the Y-carriage latch 116 and the fiche hold down 18 are released, and the Y-axis carriage 110 is moved by one step, by spring power, to present the next adjacent row, and the X-axis carriage 134 is moved by the X-axis motor 143 to X=1, for repetition of the step and repeat cycle. The step and repeat cycle is terminated by pushing off the read key 162.

As set forth also in FIG. 9, this invention also contemplates a "print cycle" wherein the microform image in a desired frame of the fiche 151 may be reproduced. In this connection, a photosensitive medium such as a film or paper or the like, is placed on the platform 12 and the read cycle, as discussed above, is brought into operation for imaging the photosensitive medium. The print cycle is the same as the read cycle except that the open time of the shutter 20 is controlled for proper imaging of the photosensitive medium. After the print cycle is completed, by closure of the shutter 20, the imaged photosensitive medium on the platform 12 may be removed and developed in the appropriate manner.

As expressed above, the dry-process mask film strip 49 is photosensitive to and imaged by the light reflecting hard copy and is developed by heat to provide microimaged transparencies therein. The dry-process mask film strip 49 may be like that described in the aforesaid U.S. Pat. No. 3,966,317. The mask film strip 49 preferably includes a flexible and substantially transparent synthetic plastic substrate, such as a Mylar or its equivalent. Coated on the substrate is a layer which is photosensitive to and imaged by light and dry developed by heat to provide imaged transparencies therein. The photosensitive layer, where negative imaging is desired, is substantially transparent and preferably includes an admixture of an oxidixing agent, a reducing agent and a catalyst former compound which forms free silver nuclei on exposure to light, all dispersed in a resin binder. More specifically, as an example, the admixture comprises silver behenate as the oxidizing agent, hydroquinone as the reducing agent, silver chloride as the catalyst former and a copolymer of butadiene and styrene as the resin binder. Only the silver chloride is photosensitive. When a light image is applied to the substantially transparent mask film strip 49, photolytic silver is formed in the silver chloride only where the light is applied to the mask film strip to provide latent images therein. When heat is applied to the mask film strip 49, by the heating element 68, the photolytic silver in the latent image catalyses a reaction between the silver behenate oxidizing agent and the hydroquinone reducing agent and the silver behenate is reduced to form relatively opaque silver crystal images in the areas of the initial latent images. The imaged and developed dry-process mask film strip 49 has substantially transparent areas corresponding to the black areas of the hard copy and substantially opaque areas corresponding to the white areas of the hard copy. Thus, the mask film strip 49 is negative working and the imaged transparency thereof a negative of the hard copy.

The dry-process microform film 151, may be substantially like that disclosed in U.S. Pat. No. 3,966,317 and, as stated above, it is preferably in the form of a microfiche. It is substantially opaque and is essentially not photosensitive to light, it having archival properties, but it is sensitive to and imaged and developed by radiant energy above a certain critical value applied thereto through the dry-process mask film strip 49 to provide imaged microform records therein which conform to the transparent microimages in the dry-process mask film strip 49 and which have archival properties. Such a dry-process microform film may be like those disclosed in U.S. Patent Application Ser. No. 162,842, filed July 15, 1971 by Robert W. Hallman, Stanford R. Ovshinsky and John P. DeNeufville, now abandoned, and in continuation in-part U.S. Patent Applications Ser. No. 577,003 filed by them on May 13, 1975 and Ser. No. 407,944, filed by them on Oct. 19, 1973, now U.S. Pat. No. 4,000,334. As one example, the microform film or fiche 151 may include a flexible and substantially transparent synthetic plastic substrate and a solid substantially opaque thin film of dispersion imaging material, such as bismuth or the like, deposited on the substrate, preferably by evaporation or the like. A protective overcoat is suitably applied over the dispersion imaging film and it preferably comprises a substantially transparent synthetic plastic or polymer film.

The substantially opaque film of the dispersion imaging material, upon the application of radiant energy thereto through the mask film strip 49 in an amount sufficient to increase the absorbed energy in the dispersion imaging material above a certain critical value, changes to a substantially fluid state in which the surface tension of the material acts to cause the substantially opaque film, where subject to said energy, to disperse and change to a discontinuous film comprising openings and deformed material which are frozen in place following said application of energy and through which openings light can pass. The so imaged microform film or fiche 151 has substantially transparent areas, afforded by the discontinuous film comprising the openings and deformed material, which correspond to the substantially transparent areas of the mask film strip 49 and substantially opaque areas corresponding to the substantially opaque areas of the mask film strip. Thus, the microform film or fiche 151 is positive working with respect to the mask film strip 49 and, where the mask film strip 49 is negative working, the imaged transparencies of the microform film or fiche are negatives of the hard copy.

Where the gamma of the microform film or fiche 151 is high, as for example 10 or more, the certain critical value of the absorbed energy is a threshold value which causes the dispersion of the imaging material in the discontinuous film areas to be substantially complete and comprises a substantially spaced apart globules in free space on the substrate to provide for maximum light transmission through the dispersed areas of the microform film.

However, as disclosed in Application Ser. No. 725,926, now U.S. Pat. No. 4,082,861, filed Sept. 23, 1976 by Masatsugu Izu and Stanford R. Ovshinsky, means may be associated with the film of imaging material in the microform film or fiche 151 for retarding the change to the discontinuous film, caused by the surface tension, and for controlling the amount of such change in accordance with the intensity of the energy applied to the microform film or fiche, through the mask film strip 49, above said certain critical value to increase the amount of such change and the area of the openings in the film and decrease the area of the deformed material and, therefore, the optical density of the film in accordance with the intensity of the applied energy above said certain critical value for providing continuous tone imaging of the microform film or fiche. Such a microform film or fiche has a relatively low gamma, for example about 2 or so, providing a continuous tone dry-process imaging. As an example, the retarding and controlling means may comprise multiple components and phase boundaries in the substantially opaque film of dispersion imaging material prior to dispersion thereof, as explained in the aforementioned Application Ser. No. 725,926, now U.S. Pat. No. 4,082,861.

Furthermore, as disclosed in said Application Ser. No. 725,926, now U.S. Pat. No. 4,082,861, the substantially opaque film of dispersion imaging material in the microform film or fiche 151 may comprise an alloy of a plurality of substantially mutually insoluble solid components having a low melting point eutectic within its system. Such a dispersion imaging material is more sensitive to the applied energy and is changed to the substantially fluid state with a lesser amount of energy applied through the mask film strip.

The dry-process microform film or fiche 151, which is essentially not photosensitive to light but which is sensitive to and imaged and developed by radiant energy above a certain critical value applied thereto through the dry-process mask film strip 49, encompasses the use of the aforementioned high gamma, low gamma and high sensitivity dispersion imaging materials as disclosed in the aforementioned U.S. Pat. No. 3,966,317 and Patent Applications Ser. Nos. 162,842, 577,003, 407,944, now U.S. Pat. No. 40,828,461 and 725,926, now U.S. Pat. No. 4,082,861. The dry-process mask film strip 49, which is photosensitive to and imaged by the light reflecting hard copy and is developed by heat to provide microimaged transparencies therein, emcompasses the use of the mask film strip disclosed in the aforementioned U.S. Pat. No. 3,966,317 and in the dry silver films developed by 3M Company and referred to in said patent.

While for purposes of illustration one preferred form of this invention has been disclosed herein, other forms thereof may become apparent to those skilled in the art upon reference to this disclosure and, accordingly, this invention is to be limited only by the scope of the appended claims.

We claim:

1. In a dry-process apparatus for producing archival microform records from light reflecting hard copy wherein a light image reflected from the hard copy is reduced to microimage size and applied at an imaging station to a dry-process mask film strip which is photosensitive to and imaged by the light reflecting hard copy and which is developed by heat to provide microimaged transparencies therein, and wherein the microimaged transparencies in the mask film strip are transferred by radiant energy above a certain critical value passing therethrough to a dry-process microform film which has archival properties and which is sensitive to an imaged and developed by the radiant energy above the critical value applied thereto through the dry-process mask film strip to provide imaged microform records therein which conform to the transparent microimages in the dry-process mask film strip and which have archival properties, the improvement comprising an imaging station including a platform for receiving the hard copy and a projection means for reducing the light image reflected from the hard copy on the platform to microimage size and applying the same to the dry-process mask film strip for producing microimaged transparencies therein for providing imaged microform records in the dry-process microform film, means for moving a desired image microform record in the dry-process microform film to the imaging station, and means including said projection means for expanding and projecting an image of the desired imaged microform record in the dry-process microform film in expanded normal size onto the platform for viewing the same.

2. A dry-process apparatus as defined in claim 1 wherein additional hard copy may be received on the platform in specific relation to the projected expanded normal size image projected onto the platform for annotation purposes, and means including said projection means for reducing an image of the additional light reflected hard copy on the platform to microimage size and applying the same to the dry-process mask film strip for producing a microimaged transparency of the additional hard copy therein and for providing an imaged microform record of the additional hard copy in the desired image microform record previously projected onto the platform for annotating the same with the additional hard copy.

3. An apparatus as defined in claim 1 wherein the hard copy received on the platform comprises information or data placed on the platform.

4. An apparatus as defined in claim 3 wherein the information or data comprises a real object placed on the platform.

5. An apparatus as defined in claim 3 wherein the information or data is contained on a substrate placed on the platform.

6. An apparatus as defined in claim 3 wherein the information or data is written on the platform.

7. An apparatus as defined in claim 1 wherein the hard copy received on the platform comprises an image of information or data projected on the platform.

8. An apparatus as defined in claim 7 wherein the image of information or data projected on the platform is derived from a transparency.

9. An apparatus as defined in claim 7 wherein the image of information or data projected on the platform is derived from a real object.

10. An apparatus as defined in claim 1 wherein the microform film is in microfiche form where the imaged microform records therein are arranged in frames.

11. An apparatus as defined in claim 1 wherein means are provided for successively moving adjacent desired image microform records in the dry-process microform film to the imaging station for successive viewing of the same.

12. An apparatus as defined in claim 1 wherein means are provided for printing the expanded normal size image projected onto the platform on a photosensitive medium placed on the platform.

13. An apparatus as defined in claim 2 wherein the additional hard copy received on the platform comprises information or data placed on the platform.

14. An apparatus as defined in claim 13 wherein the information or data is contained on a substrate placed on the platform.

15. An apparatus as defined in claim 13 wherein the information or data is written on the platform.

16. An apparatus as defined in claim 13 wherein the information or data deletes or adds to the desired image microform record previously projected onto the platform.

17. An apparatus as defined in claim 2 wherein the microform film is in microfiche form where the imaged microform records therein are arranged in frames.

18. In a dry-process apparatus for producing archival microform records from light reflecting hard copy having an imaging and developing station wherein a light imaged reflected from the hard copy is reduced to microimage size and applied to a dry-process mask film strip which is photosensitive to and imaged by the light reflecting hard copy and which is developed by heat to provide microimaged transparencies therein, and an image transferring station wherein the microimaged transparencies in the mask film strip are transferred by radiant energy above a certain critical value passing therethrough to a dry-process microform film which has archival properties and which is sensitive to and imaged and developed by the radiant energy above the critical value applied thereto through the dry-process mask film strip to provide imaged microform records therein which conform to the transparent microimages in the dry-process mask film strip and which have archival properties, means for moving the dry-process mask film strip to the imaging and developing station and to the image transferring station, and means for positioning the dry-process microform film and superimposing the dry-process mask film strip and the dry-process microform film in the image transferring station, the improvement wherein the imaging and developing station comprises a platform for receiving the hard copy and a projection means for reducing the light image reflected from the hard copy on the platform to microimage size and applying the same to the dry-process mask film strip for producing microimaged transparencies therein for subsequently providing imaged microform records in the dry-process microform film in the image transferring station, means for moving a desired imaged microform record in the dry-process microform film to the imaging and developing station, and means including said projection means for expanding and projecting an image of the desired imaged microform record in the dry-process microform film in expanded normal size onto the platform for viewing the same.

19. The dry-process apparatus as defined in claim 18 wherein the dry-process microform film is in microfiche form where the imaged microform records therein are arranged in frames.

20. A dry-process apparatus as defined in claim 18 wherein additional hard copy may be received on the platform in relation to the projected expanded normal size image projected onto the platform for annotation purposes, and means including said projection means for reducing an image of the additional light reflected hard copy on the platform to microimage size and applying the same to the dry-process mask film strip in the imaging and developing station for producing a microimaged transparency of the additional hard copy therein and for providing in the image transferring station an imaged microform record of the additional hard copy in the desired image microform record previously projected onto the platform for annotating the same with the additional hard copy.

21. The dry-process apparatus as defined in claim 20 wherein the dry-process microform film is in microfiche form where the imaged microform records therein are arranged in frames.

22. In a dry-process apparatus for producing archival microform records from light reflecting hard copy having an imaging and developing station wherein a light image reflected from the hard copy is reduced to microimaged size and applied to a dry-process mask film strip which is photosensitive to and imaged by the light reflecting hard copy and which is developed by heat to provide microimaged transparencies therein, and an image transferring station wherein the microimaged transparencies in the mask film strip are transferred by radiant energy above a certain critical value passing therethrough to a dry-process microform film which has archival properties and which is sensitive to and imaged and developed by the radiant energy above the critical value applied thereto through the dry-process mask film strip to provide imaged microform records therein which conform to the transparent microimages in the dry-process mask film strip and which have archival properties, said dry-process microform film being in microfiche form where the imaged microform records therein are arranged in frames, means for moving the dry-process mask film strip to the imaging and developing station and to the image transferring station, and means for positioning desired frames of the dry-process microform film and superimposing the dry-process mask film strip and the dry-process microform film in the image transferring station, the improvement wherein the imaging and developing station comprises a platform for receiving the hard copy and a projection means for reducing the light image reflected from the hard copy on the platform to microimage size and applying the same to the dry-process mask film strip for producing microimaged transparencies therein for subsequently providing imaged microform records in the frames of the dry-process microform film in the image transferring station, means for moving a desired imaged frame of the microform film to the imaging and developing station, means including said projection means for expanding and projecting an image of the imaged microform record in the desired frame of the microform film in expanded normal size onto the platform for viewing the same, said means for positioning desired frames of the microform film in the image transferring station and said means for moving a desired image frame of the microform film to the imaging and developing station including X-axis and Y-axis carriages for positioning a microform film holder carrying the microform film and means for moving the X-axis carriage and the Y-axis carriage and, hence, the microform film holder in the X and Y directions.

23. A dry-process apparatus as defined in claim 22 wherein said means for positioning the microform film also includes motor means for moving the X-axis and Y-axis carriages to the desired X-axis and Y-axis positions and latch means for latching said X-axis and Y-axis carriages in their desired positions.

24. A dry-process apparatus as defined in claim 23 wherein relatively movable photo transistors and lights are associated with the X-axis and Y-axis carriages for controlling the motor means and the latch means for positioning and microform film in desired positions.

25. A dry-process apparatus as defined in claim 22 wherein additional hard copy may be received on the platform in relation to the projected expanded normal size image of the desired frame of the microform film projected onto the platform for annotation purposes, and means including said projection means for reducing an image of the additional light reflected hard copy on the platform to microimage size and applying the same in the imaging and developing station to the mask film strip for producing a microimaged transparency of the additional hard copy therein and for providing in the image transferring station an imaged microform record of the additional hard copy in the desired image frame of the microform film previously projected onto the platform for annotating the same with the additional hard copy.

26. A dry-process apparatus as defined in claim 22 wherein said means for positioning the microform film also includes motor means for moving the X-axis and Y-axis carriages to the desired X-axis and Y-axis positions.

27. In a dry-process apparatus for producing archival microform records from light reflecting hard copy having an imaging and developing station wherein a light image reflected from the hard copy is reduced to microimage size and applied to a dry-process mask film strip which is photosensitive to and imaged by the light reflecting hard copy and which is developed by heat to provide microimaged transparencies therein, and an image transferring station wherein the microimaged transparencies in the mask film strip are transferred by radiant energy above a certain critical value passing therethrough to a dry-process microform film which has archival properties and which is sensitive to and imaged and developed by the radiant energy above the critical value applied thereto through the dry-process mask film strip to provide imaged microform records therein which conform to the transparent microimages in the dry-process mask film strip and which have archival properties, means for moving the dry-process mask film strip to the imaging and developing station and to the image transferring station, and means for positioning and dry-process microform film and superimposing the dry-process mask film strip and the dry-process microform film in the image transferring station, the improvement comprising a cassette containing the dry-process mask film strip and having means for indexing the mask film strip therein for providing successive microimaged transparencies therein, and wherein the means for moving the dry-process mask film strip to the imaging and developing station and to the image transferring station comprises means for moving the cassette for doing so.

28. The dry-process apparatus as defined in claim 27 wherein the cassette and the mask film strip therein are moved laterally to the imaging and developing station and to the image transferring station.

29. In a dry-process method for producing archival microform records from light reflecting hard copy wherein a light image reflected from the hard copy is reduced to microimage size and applied at an imaging station to a dry-process mask film strip which is photosensitive to and imaged by the light reflecting hard copy and which is developed by heat to provide microimaged transparencies therein, and wherein the microimaged transparencies in the mask film strip are transferred by radiant energy above a certain critical value passing therethrough to a dry-process microform film which has archival properties and which is sensitive to and imaged and developed by the radiant energy above the critical value applied thereto through the dry-process mask film strip to provide imaged microform records therein which conform to the transparent microimages in the dry-process mask film strip and which have archival properties, the improvement wherein the imaging station includes a platform for receiving the hard copy and a projection means for reducing the light image reflected from the hard copy on the platform to microimage size and applying the same to the dry-process mask film strip for producing microimaged transparencies therein for providing imaged microform records in the dry-process microform film, moving a desired image microform record in the dry-process microform film to the imaging station, and through said projection means expanding and projecting an image of the desired imaged microform record in the dry-process microform film in expanded normal size onto the platform for viewing the same.

30. A dry-process method as defined in claim 29 wherein additional hard copy is received on the platform in specific relation to the expanded normal size image projected onto the platform for annotation purposes, and through said projection means reducing an image of the additional light reflected hard copy on the platform to microimage size and applying the same to the dry-process mask film strip to producing a microimaged transparency of the additional hard copy therein and for providing an imaged microform record of the additional hard copy in the desired image microform record previously projected onto the platform for annotating the same with the additional hard copy.

31. A method as defined in claim 29 wherein adjacent desired image microform records in the microform film are successively moved to the imaging station for successive viewing of the same.

32. A method as defined in claim 29 including placing a photosensitive medium on the platform for printing the expanded normal size image projected onto the platform.

33. In a dry-process method for producing archival microform records from light reflecting hard copy having an imaging and developing station wherein a light image reflected from the hard copy is reduced to microimage size and applied to a dry-process mask film strip which is photosensitive to and imaged by the light reflecting hard copy and which is developed by heat to provide microimaged transparencies therein, and an image transferring station wherein the microimaged transparencies in the mask film strip are transferred by radiant energy above a certain critical value passing therethrough to a dry-process microform film which has archival properties and which is sensitive to and imaged and developed by the radiant energy above the critical value applied thereto through the dry-process mask film strip to provide imaged microform records therein which conform to the transparent microimages in the dry-process mask film strip and which have archival properties, moving the dry-process mask film strip to the imaging and developing station and to the image transferring station, and positioning the dry-process microform film and superimposing the dry-process mask film strip and the dry-process microform film in the image transferring station, the improvement wherein the imaging and developing station comprises a platform for receiving the hard copy and a projection means for reducing the light image reflected from the hard copy on the platform to microimage size and applying the same to the dry-process mask film strip for producing microimaged transparencies therein for subsequently providing imaged microform records in the dry-process microform film in the image transferring station, moving a desired imaged microform record in the dry-process microform film to the imaging and developing station, and through said projection means expanding and projecting an image of the desired imaged microform record in the dry-process microform film in expanded normal size onto the platform for viewing the same.

34. A dry-process method as defined in claim 33 wherein the dry-process microform film is in microfiche form where the imaged microform records therein are arranged in frames.

35. A dry-process method as defined in claim 33 wherein additional hard copy is received on the platform in relation to the projected expanded normal size image projected onto the platform for annotation purposes, and through said projection means reducing an image of the additional light reflected hard copy on the platform to microimage size and applying the same to the dry-process mask film strip in the imaging and developing station for producing a microimaged transparency of the additional hard copy therein and for providing in the image transferring station an imaged microform record of the additional hard copy in the desired imaged microform record previously projected onto the platform for annotating the same with the additional hard copy.

36. A dry-process method as defined in claim 35 wherein the dry-process microform film is in microfiche form where the imaged microform records therein are arranged in frames.

37. In a dry-process method for producing archival microform records from light reflecting hard copy having an imaging and developing station wherein a light image reflected from the hard copy is reduced to microimage size and applied to a dry-process mask film strip which is photosensitive to and imaged by the light reflecting hard copy and which is developed by heat to provide microimaged transparencies therein, and an image transferring station wherein the microimaged transparencies in the mask film strip are transferred by radiant energy above a certain critical value passing therethrough to a dry-process microform film which has archival properties and which is sensitive to and imaged and developed by the radiant energy above the critical value applied thereto through the dry-process mask film strip to provide imaged microform records therein which conform to the transparent microimages in the dry-process mask film strip and which have archival properties, said microform film being in microfiche form where the imaged microform records therein are arranged in frames, moving the dry-process mask film strip to the imaging and developing station and to the image transferring station, and positioning desired frames of the dry-process microform film and superimposing the dry-process mask film strip and the dry-process microform film in the image transferring station, the improvements wherein the imaging and developing station comprises a platform for receiving the hard copy and a projection means for reducing the light image reflected from the hard copy on the platform to microimage size and applying the same to the dry-process mask film strip for producing microimaged transparencies therein for subsequently providing imaged microform records in the frames of the dry-process microform film in the image transferring station, moving a desired imaged frame of the microform film to the imaging and developing station, through said projection means expanding and projecting an image of the imaged microform record in the desired frame of the microform film in expanded normal size onto the platform for viewing the same, said positioning of desired frames of the microform film in the image transferring station and said moving of a desired imaged frame of the microform film to the imaging and developing station being accomplished by moving the same in X and Y directions.

38. A dry-process method as defined in claim 37 wherein additional hard copy is received on the platform in relation to the projected expanded normal size image of the desired frame of the microform film projected onto the platform for annotation purposes, and through said projection means reducing an image of the additional light reflected hard copy on the platform to microimage size and applying the same in the imaging and developing station to the mask film strip for producing a microimaged transparency of the additional hard copy therein and for providing in the image transferring station an imaged microform record of the additional hard copy in the desired imaged frame of the microform film previously projected onto the platform for annotating the same with the additional hard copy.

* * * * *